United States Patent [19]
Arnold

[11] Patent Number: 5,382,006
[45] Date of Patent: Jan. 17, 1995

[54] AIRSPRING PISTON AND AIRSPRING ASSEMBLY

[75] Inventor: John E. Arnold, North Canton, Ohio

[73] Assignee: The Goodyear Tire & Rubber Company, Akron, Ohio

[21] Appl. No.: 129,933

[22] Filed: Sep. 29, 1993

[51] Int. Cl.⁶ ............................................. B60G 15/00
[52] U.S. Cl. ............................ 267/64.27; 267/64.21; 267/64.24
[58] Field of Search ............... 267/64.19, 64.21, 64.23, 267/64.24; 280/711

[56] References Cited

U.S. PATENT DOCUMENTS

| | | | |
|---|---|---|---|
| 2,920,885 | 1/1960 | Niclas | 264/64.27 |
| 3,038,717 | 2/1957 | Bank | 267/64.24 |
| 3,078,085 | 2/1967 | Bank | 267/64.24 |
| 3,549,142 | 12/1970 | Tilton | 267/64.24 |
| 4,493,481 | 1/1985 | Merkle | 267/64.24 |
| 4,506,910 | 3/1985 | Bierens | 280/711 |
| 4,718,650 | 1/1988 | Geno | 267/64.21 |
| 4,787,606 | 11/1988 | Geno et al. | 267/64.24 |
| 5,286,010 | 2/1994 | Pahl et al. | 264/64.24 |

FOREIGN PATENT DOCUMENTS

| | | | |
|---|---|---|---|
| 2905791 | 8/1980 | Germany | 267/64.24 |
| 0179538 | 9/1985 | Japan | 267/64.24 |

*Primary Examiner*—Robert J. Oberleitner
*Assistant Examiner*—Chris Schwartz
*Attorney, Agent, or Firm*—Marc R. Dion, Sr.

[57] ABSTRACT

An airspring piston which combines the features of being easily assembled, providing full air volume utilization which contributes to a low spring rate of an airspring assembly, a rounded outer peripheral edge to facilitate its assembly with a beaded flexible airsleeve and a bead retention lip to retain a beaded airsleeve on the piston in low or no pressure situations. An airspring assembly comprised of the aforementioned piston, a beaded flexible airsleeve and an upper retainer.

6 Claims, 3 Drawing Sheets

AIRSPRING PISTON AND AIRSPRING ASSEMBLY

FIELD OF THE INVENTION

This invention relates to an airspring piston. More particularly, it relates to an airspring piston used in an airspring assembly.

BACKGROUND OF THE INVENTION

Stamped steel airspring pistons have been in use for many years, but those which have provided for maximum air volume to attain the desirable low spring rate have not provided for flexible airsleeve bead retention. Aluminum and plastic pistons with retention barbs are usually costly to produce because they usually require machining and, furthermore, the large amount of material required to reinforce those types of piston reduces the amount of air volume available for operation of an airspring assembly.

SUMMARY OF THE INVENTION

One of the features of the present invention is that the airspring piston can be easily assembled. It is comprised of three metal stampings and one metal tube. The design of the top plate stamping allows it to function as a bumper reaction plate in an airspring assembly during severe jounce movements while in operation. It also serves as a flexible airsleeve bead guide to provide for easy installation of the airsleeve onto the piston. Moreover, its relative sizing in comparison to the bead seat area allows it to serve as a bead retention lip. The cylindrical piston provides support for a rolling lobe flexible airsleeve during operation. It can be contoured to modify the spring rate, however, the illustrations show it as being cylindrical.

There is also disclosed an airspring assembly comprised of the piston, a flexible beaded airsleeve, and an upper retainer.

DETAILED DESCRIPTION OF THE INVENTION

Figure 1:
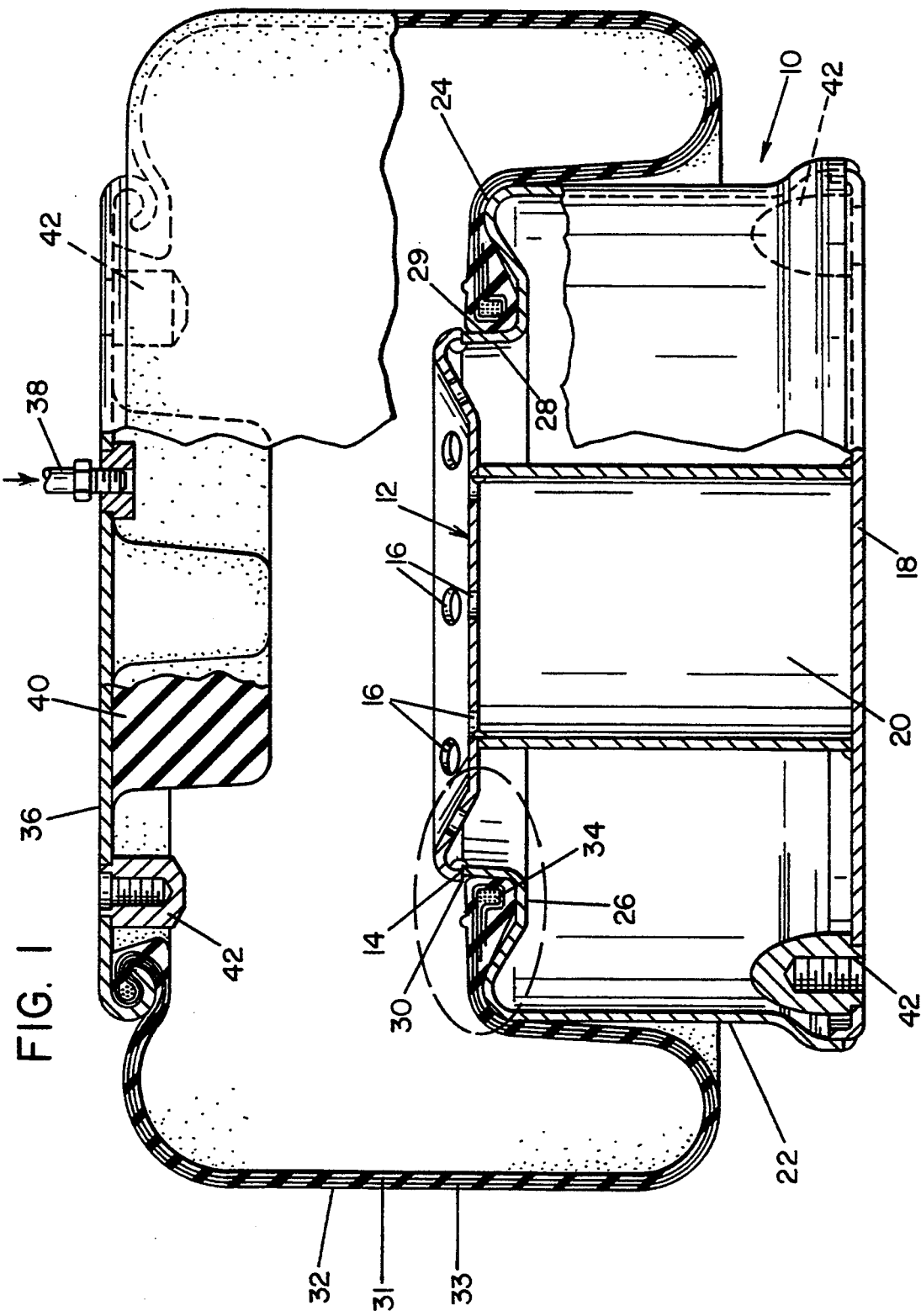
FIG. 1 is a cross-sectional view of an airspring assembly utilizing the airspring piston of the instant invention.
Figure 2:
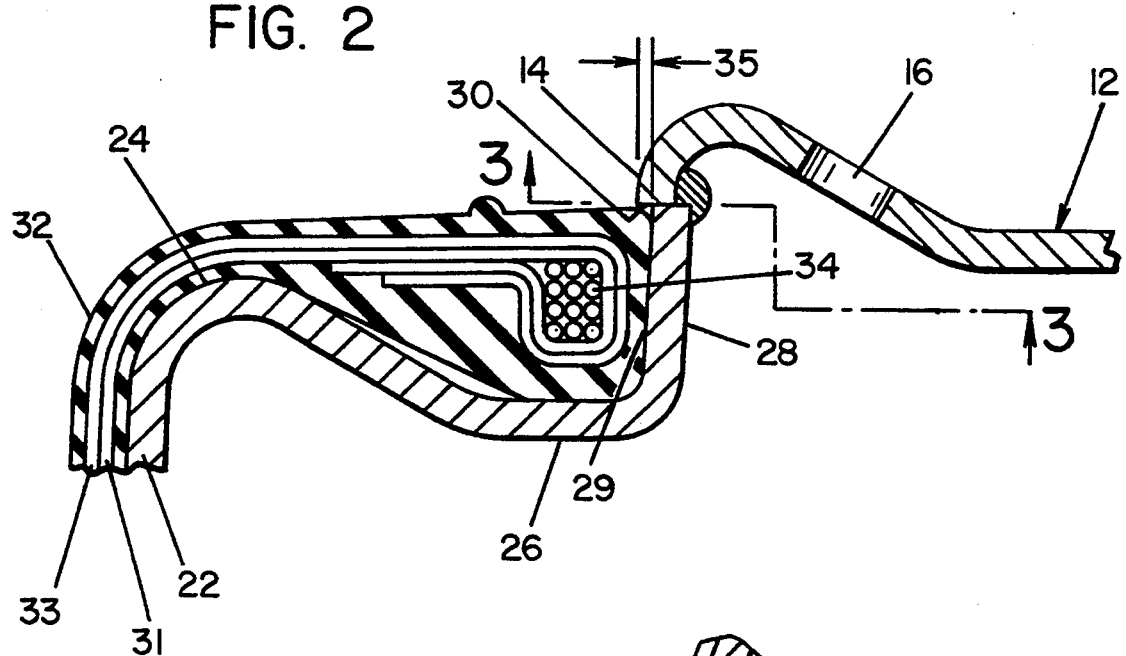
FIG. 2 is an enlarged view of the encircled portion of FIG. 1.
Figure 3:
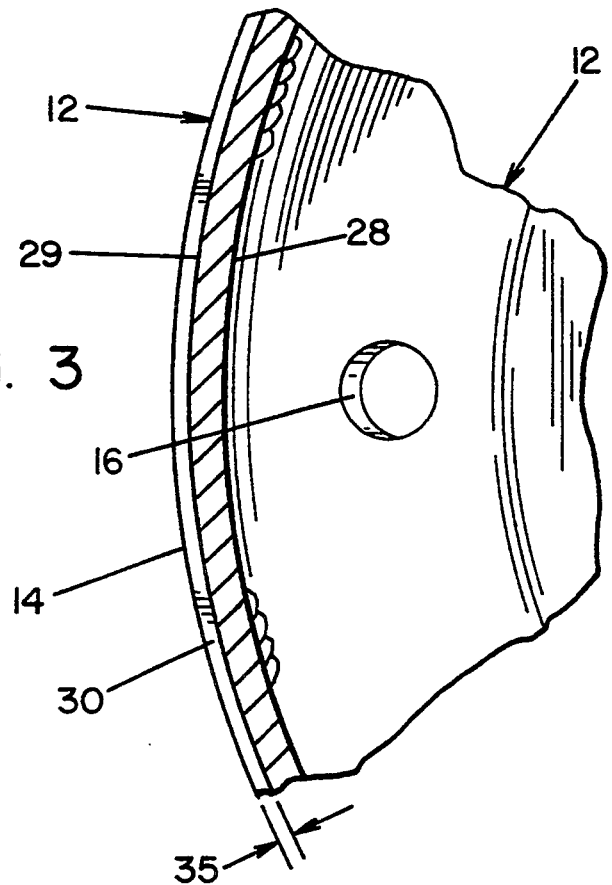
FIG. 3 is a bottom plan view taken along line 3—3 of FIG. 2.
Figure 4:
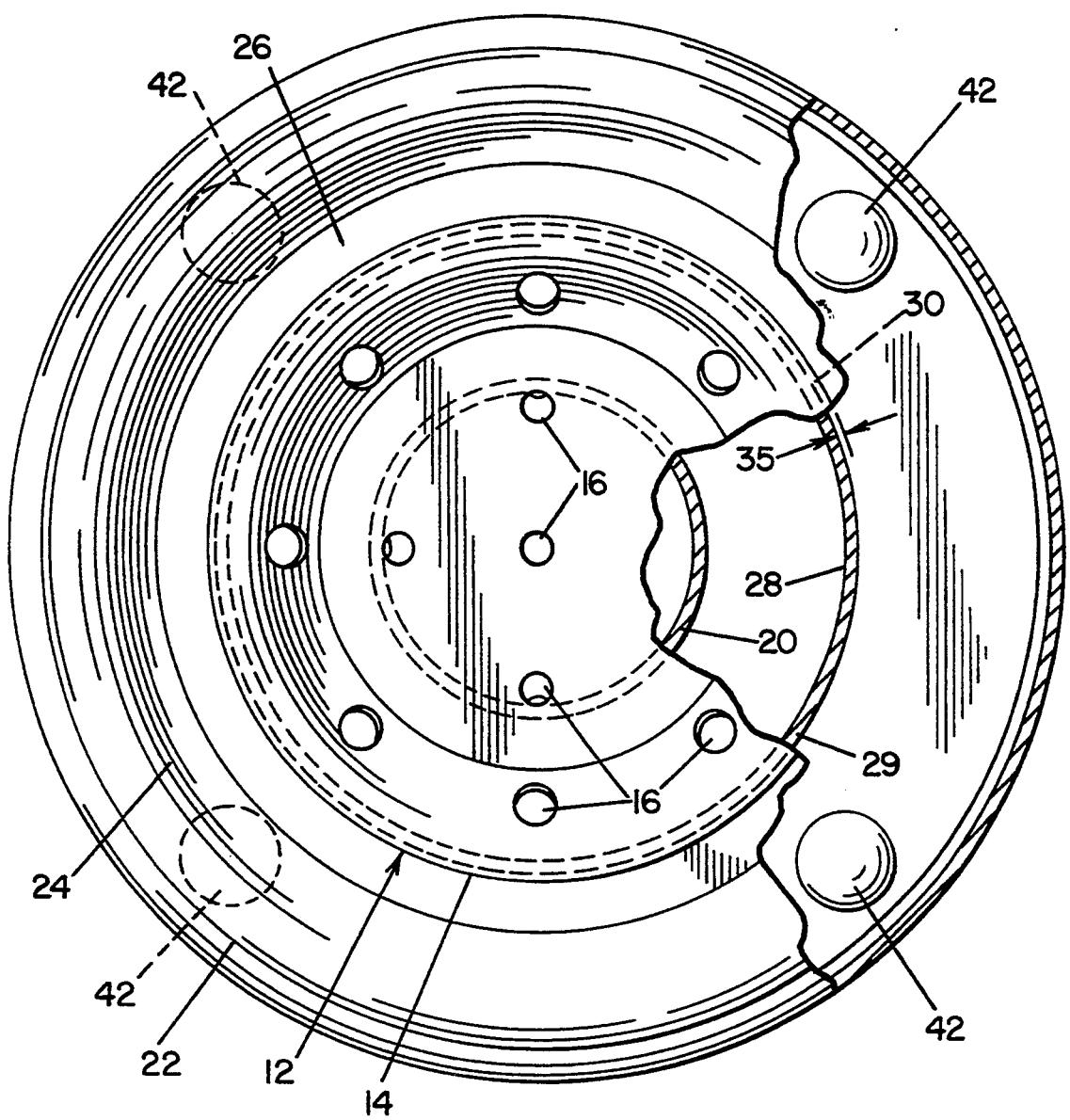
FIG. 4 is a top plan view of the piston of the instant invention.

The airspring piston of the instant invention shown generally at 10 is comprised of a top plate 12 having an outer peripheral edge 14 which is rounded perpendicular to the general plane of the plate 12 and has a plurality of vents 16. Axially spaced from the top plate 12 is a bottom plate 18 connected together by an inner tubular support 20 and intermediate outer wall 22. The intermediate outer wall 22 has an upper portion which includes a rounded shoulder 24 which slopes inwardly and downwardly to a horizonal flange 26. The upper portion of the intermediate outer wall 22 also includes a bead seat area 28 which is generally perpendicular to the flange. While it is stated that the bead seat area 28 is generally perpendicular to the flange 26, it should be appreciated that it is preferred that the bead seat area 28 be tapered from about 2° to about 6° inwardly from the flange 26.

The bead seat area 28 is connected to the peripheral edge 14 of the top plate 12 such that the outer surface 29 of the bead seat 28 is radially inwardly offset from the outer peripheral edge 14 of the top plate 12 to form a bead retention lip 30.

The radial dimension 35 of the lip 30 can be from about 1 mm to about 2.5 mm, preferably from 1.2 mm to 2.0 mm and most preferably from 1.3 mm to 1.8 mm.

The airspring piston is particularly suitable to be used in an airspring assembly comprised of the piston 10, a generally cylindrical flexible airsleeve 32 having reinforcement layers 31 and 33 and having at at least one end thereof a relatively inextensible airsleeve bead 34 connected to the bead seat area 28 of piston 10 and an upper retainer 36 connected to the other end of airsleeve 32 by any suitable means. The upper retainer 36 includes a rubber bumper 40 which serves to protect the airspring assembly during severe jouncing. The upper retainer 36 also has an air inlet 38 for adjusting the pressure within the airspring assembly. Both the upper retainer 36 and the bottom plate 18 of piston 10 can have a plurality of means for fastening 42 the airspring assembly between an unsprung and a sprung portion of a vehicle.

The vents 16 in the top plate 12 of the piston 10 allows the entire volume of piston 10 to be used in conjunction with the airsleeve to provide a desirable, low spring rate. The sizing and the rounding of the outer peripheral edge 14 of top plate 12 provides for easy assembly of the flexible airsleeve unto piston 10. The bead retention lip 30 prevents the airsleeve 32 from coming off piston 10 during periods of low or no air pressure.

While certain representative embodiments and details have been shown for the purpose of illustrating the invention, it will be apparent to those skilled in this art that various changes and modifications may be made therein without departing from the spirit or scope of the invention.

What is claimed is:

1. An airspring piston comprising:
   (a) a top plate having an outer peripheral edge which is rounded perpendicular to the general plane of the plate and a plurality of vents;
   (b) a bottom plate axially spaced from the top plate;
   (c) an inner tubular support connected between the top and bottom plates; and
   (d) an intermediate outer wall connected between the top and bottom plates, the upper portion of which includes a rounded shoulder inwardly and downwardly sloping to a horizonal flange and a bead seat area generally perpendicular to the flange and connected to the peripheral edge of the top plate such that the outer surface of the bead seat is radially inwardly offset from the outer peripheral edge of the top plate to form a bead retention lip.

2. The piston according to claim 1 wherein the seat area is tapered at an angle $\alpha$ from about 2° to about 6° from the perpendicular inwardly from the flange to the top plate.

3. The piston according to claim 1 wherein the lip has a radial dimension from about 1 mm to about 2.5 mm.

4. The piston according to claim 1 wherein the lip has a radial dimension from 1.2 mm to 2.0 mm.

5. The piston according to claim 1 wherein the lip has a radial dimension from 1.3 mm to 1.8 mm.

6. An airspring assembly comprising an airspring piston, an upper retainer and a beaded flexible airsleeve wherein the airspring piston is as described in claim 1.

* * * * *